United States Patent [19]

Moore

[11] 3,965,540
[45] June 29, 1976

[54] CLIP FOR MOUNTING A CROSSBAR TO A BRACKET

[75] Inventor: David M. Moore, Pittsburgh, Pa.

[73] Assignee: Armstrong Store Fixture Corporation, Pittsburgh, Pa.

[22] Filed: Jan. 29, 1975

[21] Appl. No.: 544,968

[52] U.S. Cl. ............................................. 24/84 R
[51] Int. Cl.² ....................................... A44B 13/00
[58] Field of Search .......... 24/255 S, 255 P, 81 CL, 24/84 H, 84 B, 81 SK, 243 K, 84 R, 67 AR 24/86 C, 81, 85 B, 85 C, 86 B

[56] References Cited
UNITED STATES PATENTS

| | | | |
|---|---|---|---|
| 1,374,204 | 4/1921 | Hucle | 24/84 B |
| 2,636,458 | 4/1953 | Harris | 24/81 B UX |
| 2,757,022 | 7/1956 | Young | 24/81 TA X |
| 2,926,403 | 3/1960 | Weissman | 24/81 B X |
| 3,227,992 | 1/1966 | Strong | 248/27 X |
| 3,315,325 | 4/1967 | Cornelius | 24/67 AR |
| 3,626,553 | 12/1971 | Darney et al. | 24/81 SK |
| 3,633,251 | 1/1972 | Gass | 24/86 C X |

*Primary Examiner*—Donald A. Griffin
*Attorney, Agent, or Firm*—Parmelee, Miller, Welsh & Kratz

[57] ABSTRACT

A clip for mounting crossbars, which are used to support hooks for displaying merchandise, to brackets mounted on a wall. The clip includes a horizontal portion at the top with two vertical walls and a restraining lip depending from the horizontal portions. The intermediate wall has a horizontal shelf which supports the crossbar. The clip is mounted on the bracket by inserting the bracket between the rear and intermediate walls, and the crossbar is inserted between the intermediate wall and the restraining lip, and rested on the horizontal shelf. The rear wall preferably extends below the edge of the bracket and includes a protrusion which extends below the bracket to secure the clip in place. The horizontal shelf of the intermediate wall preferably includes a raised lip which retains the crossbar in place once it is attached to the bracket.

6 Claims, 6 Drawing Figures

U.S. Patent June 29, 1976 3,965,540
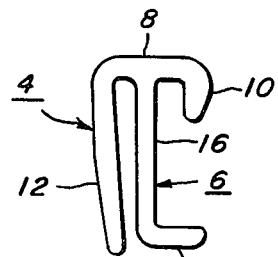
FIG. 1.
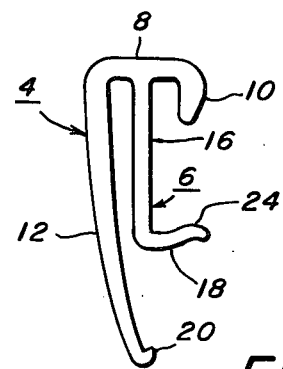
FIG. 2.
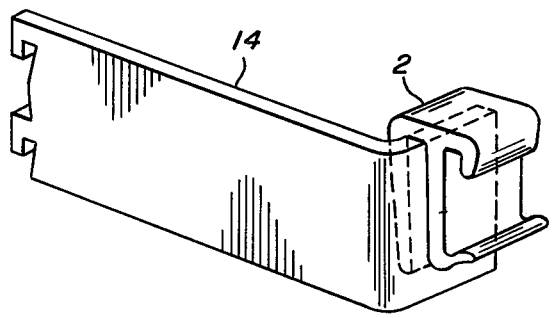
FIG. 3.
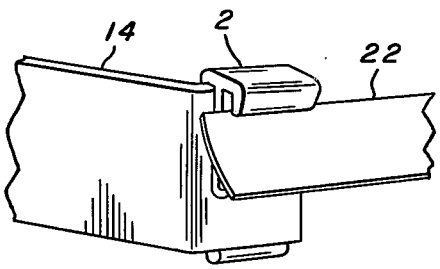
FIG. 4.
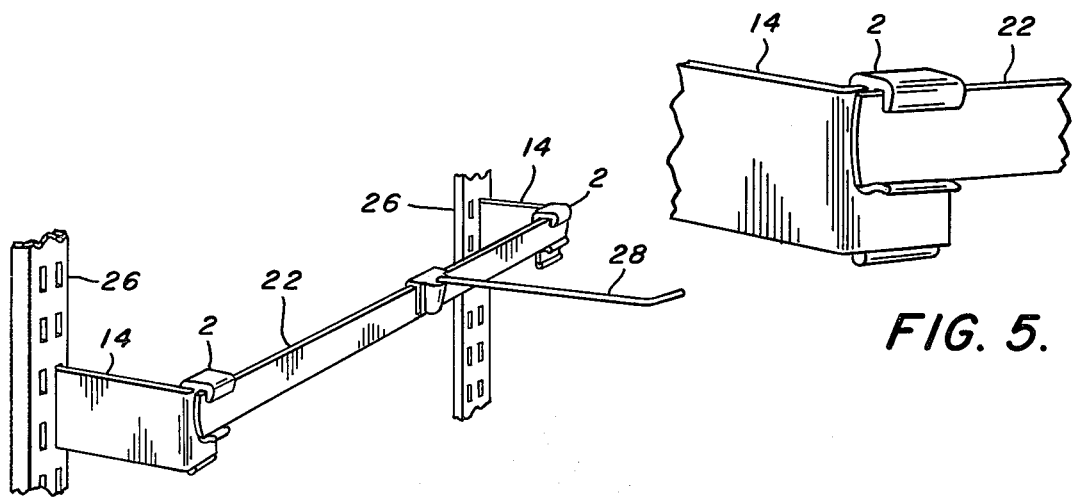
FIG. 5.
FIG. 6.

CLIP FOR MOUNTING A CROSSBAR TO A BRACKET

BACKGROUND OF THE INVENTION

1. Field of the Invention

This invention relates generally to clips used to secure one item to a second item, and more particularly to clips used for securing a crossbar used in store displays to a bracket which is mounted on a wall.

2. Prior Art

It has become common in merchandising today to package items individually on cards or otherwise with grommets which are made to be slid onto hooks, so that the merchandise may be displayed and removed from the display easily. The hangers on which the merchandise is displayed are commonly mounted on crossbars, which are, in turn, mounted on wall supports with spaced holes allowing for variations in spacing and design of the display. Such an arrangement is shown in U.S. Pat. No. 2,665,869. As shown in that patent, the crossbar is integrally mounted with the brackets which are inserted into the wall support. Such an arrangement provides minimal flexibility in display design. A later improvement of this design was to make the crossbar separate from the bracket which mounted on the wall supports, so that brackets of various lengths could be used in order to place the crossbar at various distances from the wall. Typically, the crossbar was mounted to the bracket by use of a metal-to-metal connector formed as part of the bracket and the crossbar. Such an arrangement required that the wall supports be installed very carefully so that they were exactly the correct distance apart. If there was an error in installing the wall supports, the metal-to-metal connection between the bracket and the crossbar would not fit. Variations on the connection between the crossbar and the bracket were devised, such as that shown in U.S. Pat. No. 3,739,920, where rotatable supports were used to mount the crossbar to a bracket which was, in turn, mounted to the wall support. The present invention is intended to serve the purpose of allowing flexibility in mounting crossbars to brackets without the necessity of complicated mechanical linkages.

SUMMARY OF THE INVENTION

The present invention is a clip for mounting a crossbar to a bracket having a first member with a cross-section in the form of an inverted J, and a second member with a cross-section in the form of an L. The first member includes a horizontal portion, a restraining lip depending from one end of the horizontal portion, and a rear wall depending from the other end of the horizontal portion. The second member includes an intermediate wall spaced between the rear wall and the restraining lip, and a horizontal shelf extending from the lower end of the intermediate wall. The two members are integrally formed, preferably from a substantially rigid plastic, such as a polycarbonate. The rear wall preferably corresponds in length with the width of the bracket, and includes a protrusion which extends below the bracket to secure the clip to the bracket. In use, the crossbar is inserted between the intermediate wall and the restraining lip, and is supported by the horizontal shelf. A raised upper surface may be provided on the horizontal shelf in order to retain the crossbar in place.

BRIEF DESCRIPTION OF THE DRAWINGS

FIG. 1 is a side elevation view of one embodiment of the clip of the present invention;

FIG. 2 is a side elevation view similar to FIG. 1 showing another embodiment of the clip of the present invention;

FIG. 3 is a perspective view showing the clip of the present invention mounted on a bracket;

FIG. 4 is a perspective view showing a crossbar in the process of being inserted into the clip of the present invention;

FIG. 5 is a view similar to FIG. 4 showing the crossbar in place and secured by the clip of the present invention; and FIG. 6 is a perspective view showing the clip of the present invention in use in a display system including wall supports, brackets, a crossbar and hangers.

DETAILED DESCRIPTION OF THE PREFERRED EMBODIMENT

The structure of the clip of the present invention can best be seen in FIGS. 1 and 2, which are side views of two embodiments of the clip of the present invention, showing the shape of the clip as it may be seen in cross-section. The other figures of the drawings show a clip having a width of approximately one inch. Such a width is typical for use in many of the displays in which the clip may be used, but the clip would not necessarily be of such width in all applications. Although the cross-section design of the clip will always be substantially constant, the width of the clip will vary according to the strength required in its particular application. Thus, if a longer crossbar is to be used than that shown in FIG. 6 of the drawings, or if a heavy load is to be supported, a wider clip may be necessary in order to support the additional weight. Similarly, if a particularly small crossbar is being used or a smaller amount of weight is being supported by the crossbar, the clip may be narrower and still provide sufficient support to the crossbar.

As shown in FIGS. 1 and 2, the clip 2 of the present invention may be divided into a first member 4 and a second member 6. Although the clip 2 will normally be formed in one piece, such as by extrusion, it has been divided into first member 4 and second member 6 for the purposes of this description in order to more clearly describe the structure of the invention. First member 4 has the shape of an inverted J and includes a horizontal portion 8, a restraining lip 10 depending from one end of the horizontal portion 8, and a rear wall 12 depending from the other end of the horizontal portion 8. Although the clip 2 may be mounted to a bracket 14 in more than one position, the present description will assume, in using the terms "front" and "rear", that the clip is positioned as shown in FIG. 3.

The second member 6 is of L-shaped cross-section, and includes an intermediate wall 16 and a horizontal shelf 18. The intermediate wall 16 is integrally formed with and depends from the horizontal portion 8 of the first member 4. The horizontal shelf 18 extends from the lower end of the intermediate wall 16.

The intermediate wall 16 of the clip 2 is spaced from the rear wall 12 a distance corresponding to the thickness of the bracket 14, so that the clip will maintain a snug fit on the bracket 14 when the bracket 14 is inserted in the space between the rear wall 12 and the intermediate wall 16. In order to provide more secure attachment of the clip 2 to the bracket 14, the rear wall 12 may extend to a length corresponding to the width of the bracket 14, as shown in FIG. 2, and include a protrusion 20 at the lower end of the rear vertical 12 which will extend under the bracket 14 to more fully secure the clip 2 to the bracket 14. When the clip 2 is mounted on the bracket 14, as shown in FIG. 3, the crossbar 22 may be inserted between the intermediate wall 16 and the restraining lip 10, as shown in FIG. 4. The lower edge of the crossbar 22 is then pressed back so as to rest on the horizontal shelf 18. In order to retain the crossbar 22 in place, a raised lip 24 may be provided on the horizontal shelf 18 of the second member 6, as shown in FIG. 2, so that the crossbar 22 will snap into place and be retained by the raised lip 24, as shown in FIG. 5.

The clip of the present invention is preferably made from a substantially rigid material with a small amount of resilience, or "give", which allows the bracket and crossbar to be inserted into place and then securely held in place by the rigidity of the material. A suitable material for this purpose is a plastic such as polycarbonate. The use of polycarbonate also has the advantage of allowing the clip to be clear, so as to enhance the overall appearance of the display rack. The clip 2 may also be made so that the space between the rear wall 12 and the intermediate wall 16 is smaller at the bottom than at the top, as shown in FIGS. 1 and 2. This will require the clip 2 to be forced over the bracket 14, and increases the grip of the clip 2 on the bracket 14.

In use, as shown in FIG. 6, two or more brackets 14 are attached to wall standards 26, and one clip 2 is attached to each bracket 14 as previously described. A crossbar 22 is inserted into the clips 2, and snapped into place. Hangers 28 are then hung at desired intervals on the crossbar 22, and merchandise is hung from the hangers 28 for display. If the crossbar 22 is particularly long, additional brackets 14 and clips 2 may be used at intermediate points on the crossbar 22 for additional support.

There has been described a novel clip for mounting a crossbar to a bracket. This clip allows for increased flexibility in the arrangement of crossbars, and in the number and position of supports for the crossbars. The clip also allows for easy alteration of display arrangements after a display is originally assembled.

I claim:

1. An integral clip for mounting a crossbar to a bracket, comprising:
   a first member having a cross-section in the form of an inverted J, including
     a horizontal portion,
     a retaining lip depending from the front end of the horizontal portion, and
     a rear wall vertically depending from the rear end of the horizontal portion; and
   a second member of L-shaped cross-section, integrally formed with the first member, including
     an intermediate wall spaced between the retaining lip and the rear wall, and vertically depending from the horizontal portion of the first member, and
     a horizontal shelf extending forwardly from the lower end of the intermediate wall,
   such that when the clip is mounted on the bracket with the bracket located in the space between the rear wall and the intermediate wall, the crossbar may be mounted in the space between the intermediate wall and the retaining lip, and supported by the horizontal shelf.

2. A clip for mounting a crossbar to a bracket as defined in claim 1, wherein the length of the rear wall corresponds with the width of the bracket, and including a protrusion integrally formed with and extending forwardly from the lower end of the rear wall.

3. A clip for mounting a crossbar to a bracket as defined in claim 1, wherein the space between the rear wall and the intermediate wall decreases as the distance from the horizontal portion of the first member increases.

4. A clip for mounting a crossbar to a bracket as defined in claim 1, wherein the front portion of the upper surface of the horizontal shelf is raised so as to retain the crossbar in the clip.

5. A clip for mounting a crossbar to a bracket as defined in claim 1, wherein the clip is made of a plastic which is substantially rigid.

6. A clip for mounting a crossbar to a bracket as defined in claim 5, wherein the plastic is a polycarbonate.

* * * * *